US012785420B2

(12) United States Patent
Dochterman et al.

(10) Patent No.: US 12,785,420 B2
(45) Date of Patent: Nov. 3, 2026

(54) MARINE BATTERY WITH INTERNAL DIGITAL SECURITY

(71) Applicant: Brunswick Corporation, Mettawa, IL (US)

(72) Inventors: David W. Dochterman, Panama City, FL (US); Brad E. Taylor, Stillwater, OK (US); Scott M. Westpfahl, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 226 days.

(21) Appl. No.: 18/080,092

(22) Filed: Dec. 13, 2022

(65) Prior Publication Data

US 2024/0195187 A1 Jun. 13, 2024

(51) Int. Cl.

| | |
|---|---|
| ***H02J 7/47*** | (2026.01) |
| ***B60R 25/045*** | (2013.01) |
| ***B63B 17/00*** | (2006.01) |
| ***H02J 7/90*** | (2026.01) |

(52) U.S. Cl.

CPC .............. *H02J 7/47* (2026.01); *B60R 25/045* (2013.01); *B63B 17/00* (2013.01); *H02J 7/90* (2026.01); *B63B 2017/0009* (2013.01)

(58) Field of Classification Search

None

See application file for complete search history.

(56) References Cited

U.S. PATENT DOCUMENTS

| | | | |
|---|---|---|---|
| 7,104,851 | B1 | 9/2006 | Gonring et al. |
| 9,284,032 | B1 | 3/2016 | Snyder et al. |
| 9,352,723 | B2 | 5/2016 | Yamamoto |

(Continued)

FOREIGN PATENT DOCUMENTS

| | | | |
|---|---|---|---|
| CN | 204915915 U | * 12/2015 | |
| EP | 2908193 A2 | 8/2015 | |

OTHER PUBLICATIONS

Translated description of CN204915915U (Year: 2015).*

(Continued)

*Primary Examiner* — Adam D Tissot
*Assistant Examiner* — Laura E Linhardt
(74) *Attorney, Agent, or Firm* — Andrus Intellectual Property Law, LLP

(57) ABSTRACT

A system and method for deterring the theft of a marine battery pack used to power a marine propulsion system, such as an outboard motor. The marine battery pack includes an internal communication system that allows the battery pack to communicate with an authentication device. The battery pack communicates an authentication request to the authentication device. If the battery pack is associated with the authentication device, a confirmation is communicated to the marine battery pack and the marine battery pack operates in a normal manner. If confirmation is not received from an authentication device, the operation of the marine battery pack is modified from the normal condition. The modification of the operation of the battery pack renders the battery pack unusable to deter theft. Each battery pack may be associated with more than one authentication device and each authentication device may be associated with more than one battery pack.

17 Claims, 8 Drawing Sheets

(56) References Cited

U.S. PATENT DOCUMENTS

| | | | | |
|---|---|---|---|---|
| 2011/0136398 | A1* | 6/2011 | Takeda | B63J 99/00 440/1 |
| 2011/0270480 | A1* | 11/2011 | Ishibashi | B60L 53/305 320/135 |
| 2016/0207604 | A1* | 7/2016 | Yoshikawa | B63H 20/00 |
| 2017/0110901 | A1* | 4/2017 | Amarasekara | B60L 53/80 |
| 2022/0328893 | A1 | 10/2022 | Oenick et al. | |
| 2022/0328943 | A1 | 10/2022 | Mueller et al. | |
| 2023/0398883 | A1* | 12/2023 | Iwamoto | B60L 53/14 |

OTHER PUBLICATIONS

Pending U.S. Appl. No. 17/585,259, filed Jan. 26, 2022, to Collins et al.

Pending U.S. Appl. No. 17/585,285, filed Jan. 26, 2022, to Jaszewski et al.

1 European Search Report for European U.S. Appl. No. 23/215,472, mailed Jul. 1, 2024.

* cited by examiner

MARINE BATTERY WITH INTERNAL DIGITAL SECURITY

FIELD

The present disclosure generally relates to battery powered marine propulsion devices, such as battery powered outboard motors. More particularly, the present disclosure relates to marine propulsion devices having electric motors powered by battery packs where the battery packs includes digital security systems to reduce battery theft.

BACKGROUND

Battery packs configured to power electric marine propulsion devices store large amounts of energy. These battery packs, such as lithium-ion (li-ion) battery packs, have high energy densities and are configured to deliver energy at high currents and voltages. The energy is often stored in smaller storage elements, such as battery cells or groups of battery cells, housed and electrically connected together in series to generate a high voltage output. These battery packs generally have external housings, or enclosures, configured to protect the battery cells and prevent water ingress and also to safely contain the high voltage storage elements.

One specific type of battery pack, referred to as a marine battery pack, can be used to power electric outboard propulsion devices. The marine battery pack can be located either within the outer cowling of the electric marine propulsion device or can be located outside of the cowling and connected to an electric motor within the cowling to provide power to the electric motor. Lithium-ion battery packs are becoming increasingly popular to power a wide variety of devices, from lawn and garden tools, hand tools, construction equipment, portable generators, small vehicle, etc. Presently, due to relatively high material costs, lithium-ion battery packs have a well-known value, which make the battery packs susceptible to theft and resale for use by others.

Presently, theft deterrent systems exist to prevent or reduce the likelihood of theft of a marine vessel including a marine engine or motor. The following patents and patent publications are hereby incorporated by reference in their entireties:

U.S. Pat. No. 7,104,851 discloses a security system for a marine vessel that uses identification values to ascertain whether or not the devices used in a marine vessel control system are those which are expected. If an identification value is received by one device from another device, appropriate operation of the devices is permitted. However, if an incorrect identification value is received or no identification value is received, continued operation of the marine propulsion system is disabled.

U.S. Pat. No. 9,284,032 discloses a control system and method of operation for deterring theft of a marine vessel. A security control circuit is provided that receives a transponder identification code from a transponder. The engine control circuit has a status that is determined and based on a comparison of a stored identification code with the transponder identification code. The status of the engine control circuit is locked if the stored identification code does not match the transponder identification code and the status of the engine control circuit is unlocked if the stored identification code does match the transponder identification code. The security control circuit determines an arbitrated lock status of the control system based on a conjunctive analysis of the locked and unlocked statuses of a plurality of engine control circuits connected to a network bus, and indicates the arbitrated lock status to an operator of the marine vessel.

Although security systems exist to deter the theft of the marine vessel or the removal and theft of the entire outboard motor, the inventors have recognized a desire and need for providing a security system for the battery packs themselves to deter theft of the battery packs and to prevent use of stolen battery packs in other applications or with other devices.

SUMMARY

This Summary is provided to introduce a selection of concepts that are further described hereinbelow in the Detailed Description. This Summary is not intended to identify key or essential features of the claimed subject matter, nor is it intended to be used as an aid in limiting the scope of the claimed subject matter.

In one non-limiting aspect of the present disclosure, a system and method for deterring theft of a component of a marine propulsion device, such as a battery pack, is shown and described. The system includes a marine battery pack that includes an internal communication system. In one embodiment, the marine battery pack includes a plurality of lithium-ion battery cells, although other types of battery cells are contemplated. The internal communication components of the battery pack are able to generate an authentication request that is transmitted externally from the battery pack.

The system of the present disclosure further includes an authentication device that is able to communicate with the battery pack. When the battery pack generates the authentication request, the request can be received by the authentication device. If the battery pack is associated with the authentication device, the authentication device will generate a confirmation. The confirmation is communicated back to the battery pack. If the battery pack is properly authenticated and the confirmation is received back at the battery pack, the battery pack operates in a normal operating condition.

If no confirmation is received from an authentication device after the authentication request is generated by the battery pack, the operation of the battery pack is modified to generally render the battery pack unusable in the normal operation condition. The modification of the operation of the battery pack renders the battery pack unusable, thereby deterring theft of the battery pack from the outboard motor.

In one exemplary embodiment of the present disclosure, the operation of the battery pack is modified by restricting the amount of current that can flow out of the battery pack. By restricting the current flow from the battery pack, any electrically device connected to the battery pack, such as an electric motor, will only be able to operate at less than full speed.

In another exemplary embodiment of the present disclosure, the operation of the battery pack is modified by allowing full discharge of the battery pack but preventing recharging of the battery pack until the battery pack is authenticated by a proper authentication device. Such modification will again prevent use of the battery pack after the full discharge and will reduce the likelihood of theft.

In one exemplary embodiment of the present disclosure, the authentication device can be a battery recharger. In such embodiment, the battery pack must be authenticated by the battery charger before the internal components in the battery pack will allow recharging of the battery pack. Such embodiment would allow use of the battery pack for the duration of the present charge but would prevent subsequent use of the battery pack after discharge.

The system of the present disclosure will allow more than one battery pack to be associated with a single authentication device. In this manner, more than one battery pack can be used with the authentication device, which will allow replacement of a discharged battery pack with a charged battery pack.

The system of the present disclosure can further allow a single battery pack to be associated with more than one authentication device. Such exemplary embodiment would allow battery packs to be used with more than one outboard motor or marine propulsion device.

In another non-limiting aspect of the present disclosure, a method is provided to deter the theft of a marine battery pack that is configured to power a marine propulsion device, such as but not limited to an outboard motor. The marine battery pack includes an internal communication system that generates an authentication request upon activation or installation of the battery pack. The authentication request can be received by an authentication device that compares the authentication request with a listing of associated battery packs for the authentication device. If the battery pack is associated with the authentication device, the authentication device generates a confirmation thereby indicating that the battery pack is useable with the marine propulsion device associated with the authentication device. When the marine battery pack receives the confirmation, the internal components of the battery pack, such as a battery monitoring system, allow the battery pack to operation in a normal condition.

If a confirmation is not received by the battery pack, the operation of the battery pack will be modified away from the normal operating condition. It is contemplated that the modification of the operation of the battery pack will be sufficient to generally render the battery pack unusable for normal operation. Since the battery pack will be generally unusable without proper authentication, theft of the battery will be deterred.

Various other features, objects, and advantages of the invention will be made apparent from the following description taken together with the drawings.

BRIEF DESCRIPTION

The present disclosure is described with reference to the following Figures. The same numbers are used throughout the Figures to reference like features and like components.

DETAILED DESCRIPTION

The present disclosure generally relates to marine propulsion devices, and more specifically to marine propulsion devices, such as an outboard motor, having an electric motor within a drive housing and powered by a battery pack, such as a lithium-ion battery pack.

Vehicle electrification and the application of electric marine propulsion systems and lithium-ion (li-ion) battery technology for directly powering electric motors of the marine propulsion systems has created particular issues relating to the desirability of the marine battery packs. The inventors have recognized that a very significant portion of the value in an electric outboard motor resides in the value of the battery pack. As such, particular issues may arise relating to the theft of the battery packs, and specifically lithium-ion battery packs, and the possibility of use of the stolen marine battery packs in other non-marine applications.

Presently, small boats or dinghies that utilize internal combustion engines contained in an outboard motor are targets for theft of the entire outboard motor. As such, theft-deterrent concepts have been developed to reduce the theft of the entire outboard motor from the dinghy. These concepts may include lifting the dinghy or motor out of the water at night, cable or chain locking the outboard motor to the dingy or installing locking devices on the outboard motor While these systems provide some security for the theft of the entire outboard motor, electric outboard motors that are powered by marine battery packs, such as lithium-ion battery packs, have a large percentage of the value of the marine propulsion system included in the marine battery pack itself.

As a result, the inventors have recognized a desire and need for providing a security system for the marine battery packs themselves to reduce theft and the subsequent use of the battery packs in other applications or with other devices.

Figure 1:
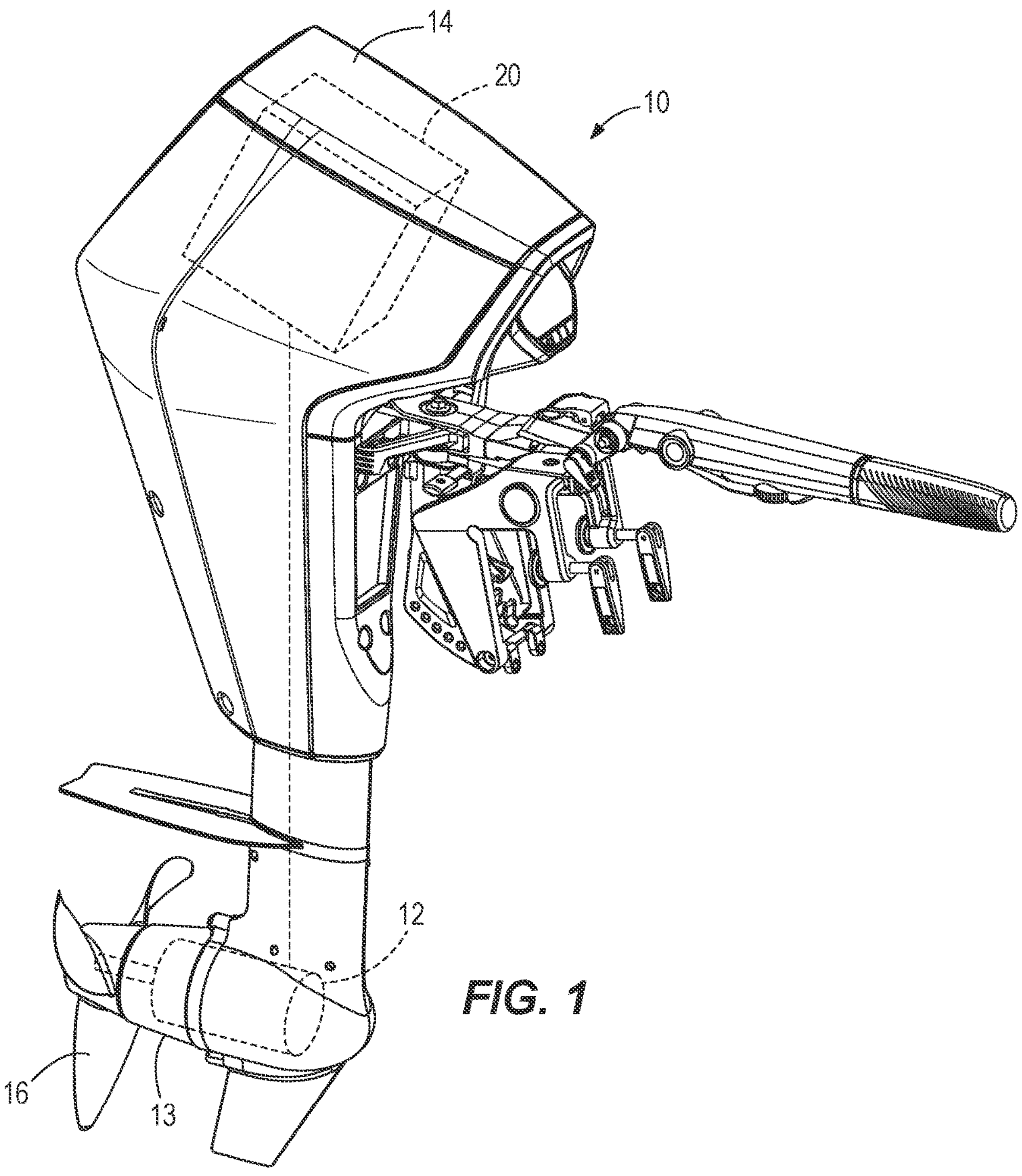
FIG. 1 illustrates an exemplary battery powered marine propulsion device that can be used with the theft deterrent system and method of the present disclosure.

FIG. 1 depicts an embodiment of an electric marine propulsion device 10 that is powered by a power storage system, such as a Li-ion marine battery pack 20. Although lithium-ion is described as being a preferred type of battery pack, it is contemplated that other chemistries could be incorporated into the marine battery pack. In the depicted embodiment, the electric marine propulsion device 10 takes the form of an outboard motor having an electric motor 12 housed within a lower unit 13 and connected to the battery pack 20. In the embodiment shown, the battery pack 20 is housed within the cowl 14 of the outboard motor. A person of ordinary skill in the art will understand in view of the present disclosure that the marine propulsion device 10 may include other types of electric marine propulsion devices, such as inboard drives, stern drives, jet drives, or the like. In the exemplary marine propulsion device 10, the outboard motor has an electric motor 12 configured to propel the marine vessel by rotating a propeller 16. In the embodiment shown, the electric motor 12 is located within a lower unit 13. The electric motor 12 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor includes a rotor and a stator, as is well known in the relevant art.

The electric motor 12 shown in FIG. 1 is electrically connected to and powered by a power storage system. The power storage system stores energy for powering the electric motor 12 and is rechargeable, such as by connection to shore power when the outboard motor is not in use. Various power storage systems are known in the art and are suitable for powering an electric marine drive, such as a li-ion battery pack 20 shown coupled to the electric drive motor 12 in FIG. 1. In the depicted example, a bank or group of cell modules is connected in series to provide a large voltage output.

Further details of the battery and the electric outboard motor are provided in U.S. patent application Ser. Nos. 17/585,259 and 17/585,285, both filed Jan. 26, 2022, incorporated by reference herein.

Figure 2:
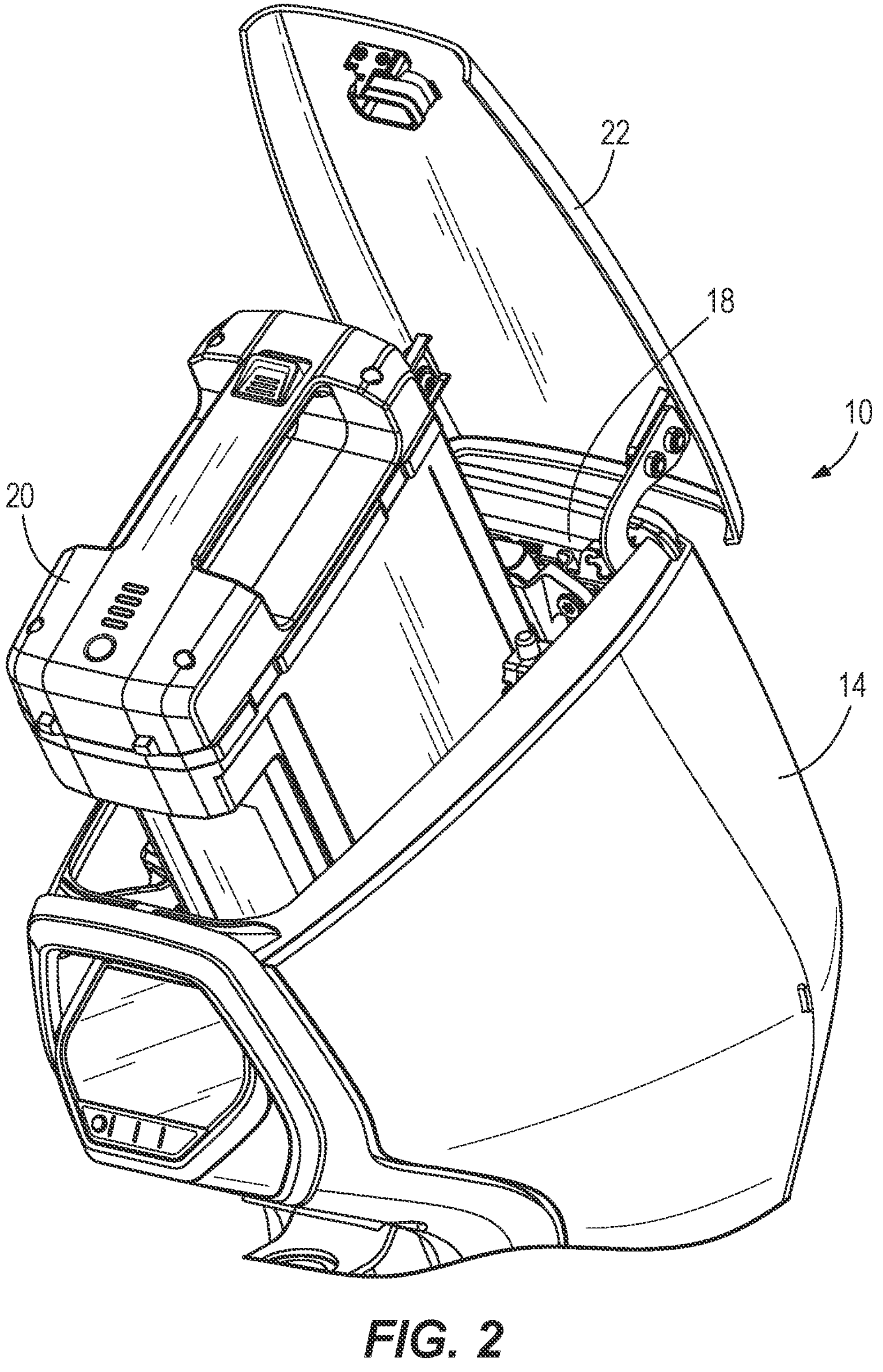
FIG. 2 illustrates the location and connection of a marine battery pack in the marine propulsion device of FIG. 1.

In one exemplary embodiment shown in FIG. 2, the outer cowl 14 of the marine propulsion device 10 defines an open interior 18 that is sized to receive the marine battery pack 20. The outer cowl 14 includes a top hatch 22 that can be opened, as illustrated, to allow the battery pack 20 to be inserted and removed from the marine propulsion device 10. In the embodiment shown in FIG. 2, a single battery pack 20 is received within the outer cowl 14. However, it should be understood that more than one battery pack 20 could be received within the open interior 18 depending upon the size of the marine propulsion device 10.

Figure 3:
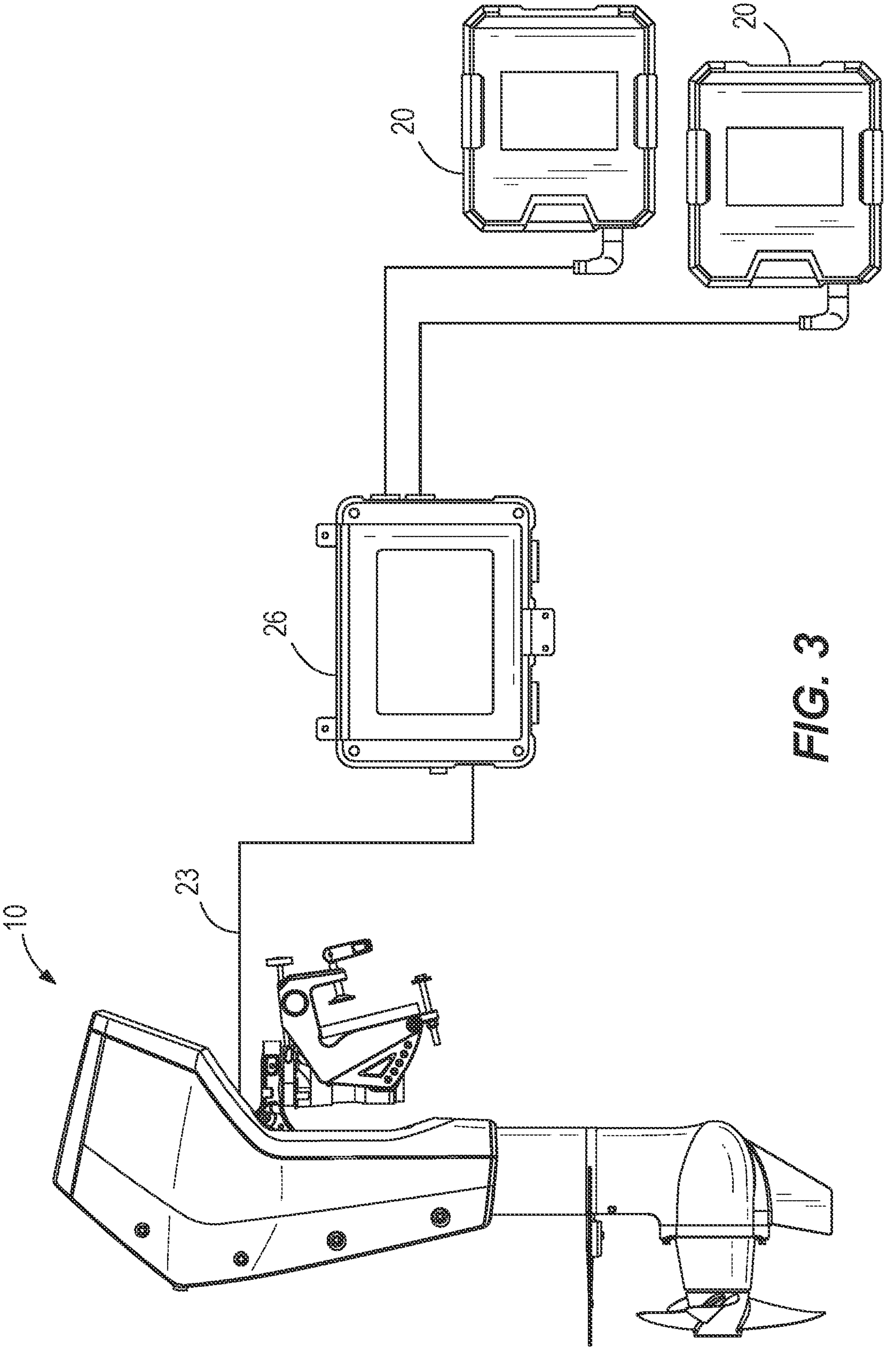
FIG. 3 shows an alternate connection between a plurality of marine battery packs and a marine propulsion device.

In addition to the embodiment illustrated in FIG. 1 in which the battery pack 20 is received within the open interior 18, it is also contemplated that the marine propulsion device 10 could be electrically connected to one or more marine battery packs 20 which are located remotely from the marine propulsion device 10, such as illustrated in FIG. 3. In the embodiment shown in FIG. 3, a pair of marine battery packs 20 are electrically connected to the marine propulsion device 10 through a power connection cord or wire 23. In the embodiment shown, an intermediate switch box 26 is positioned between the marine propulsion device 10 and the pair of battery packs 20. The switch box 26 allows for different numbers of battery packs 20 to be used to power the marine propulsion device 10. It is contemplated that larger horsepower outboard motors may require several battery packs 20 that are joined to each other to provide the required voltage and current to drive the electric motor contained within the outboard motor. However, it should be understood that the switch box 26 could be eliminated in embodiments in which the battery packs 20 are connected in series or where a single marine battery pack 20 is sufficient to power the marine propulsion device 10.

In one example, the li-ion battery packs 20 can be 250 V DC or more, such as 450 V DC, 550 V DC, or an even higher voltage pack such as 800 V DC.

As can be understood in FIGS. 2 and 3, the marine battery packs 20 can be easily removed from the entire marine power device by either disconnecting the battery pack 20 shown in FIG. 3 or removing the battery pack 20 shown in FIG. 2 from the outer cowl 14. As described previously, the marine battery packs 20 have intrinsic value as separate components and thus are susceptible to theft if the marine propulsion device 10 and the associated battery packs 20 are left unattended, such as at a marina, dock or other storage location overnight. Therefore, a desire exists to provide a theft deterrent system to deter possible theft by restricting the use of the marine battery packs 20.

Figure 4:
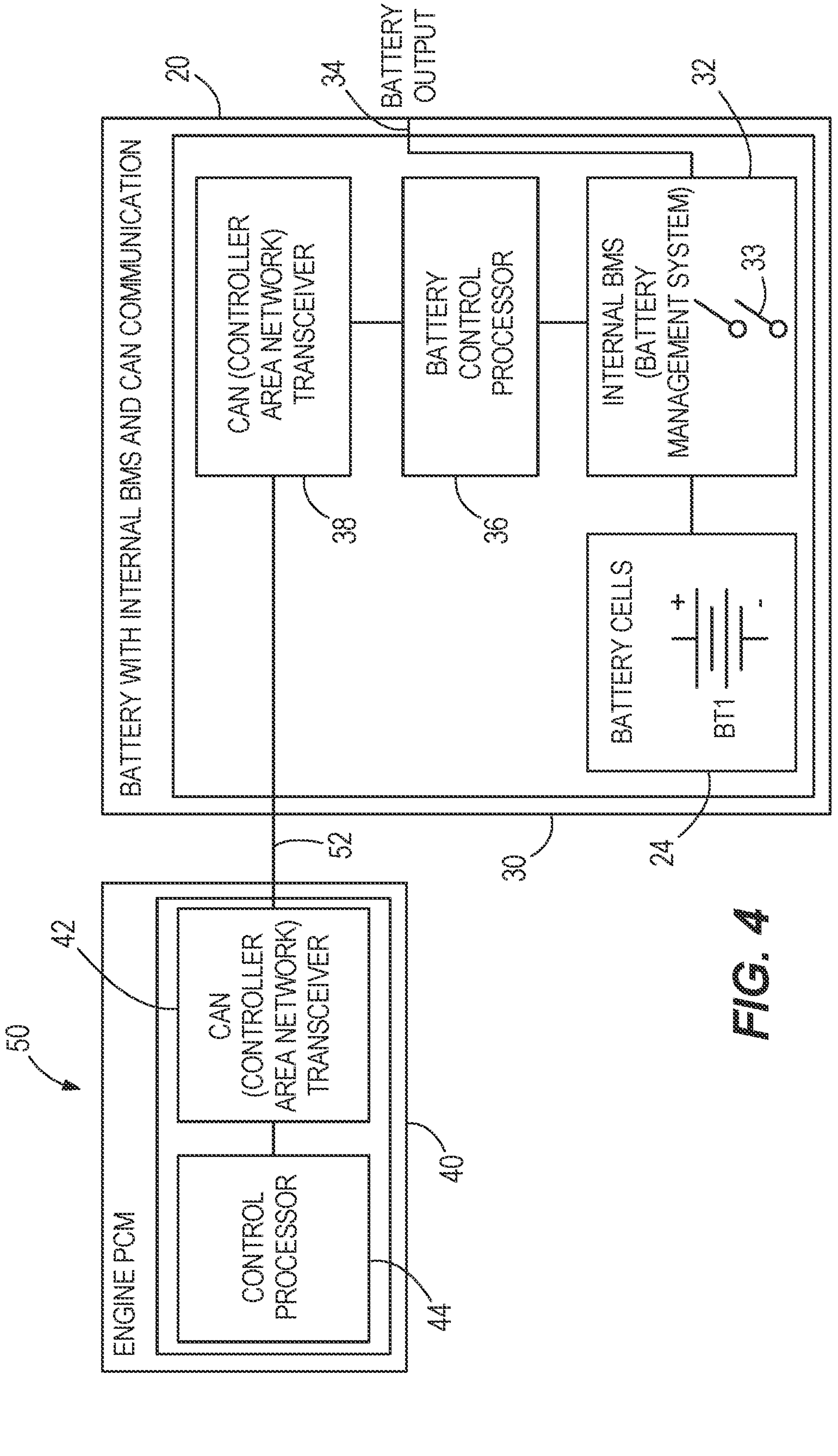
FIG. 4 is a schematic view of the theft deterrent system in accordance with one exemplary embodiment of the present disclosure.

FIG. 4 illustrates a first exemplary embodiment of the theft deterrent system in accordance with the present disclosure. In FIG. 4, the marine battery pack 20 is schematically illustrated. The marine battery pack 20 of the illustrated embodiment includes a series of battery cells 24 that are contained within the outer housing 30 of the marine battery pack 20. In the depicted example, the battery cells 24 are a series of lithium-ion battery cells that are connected in series to provide a large voltage output at the battery outlet 34 that can be used to provide power for the electric motor contained within the marine propulsion device.

In the depicted embodiment, the marine battery pack 20 includes an internal battery management system (BMS) 32 that is configured to monitor and/or control various aspects of the discharge of voltage and current from the series of battery cells 24. The internal BMS 32 is also operable to monitor the current into and out of the battery and thus dictates the current and voltage at the battery output 34. The internal BMS 32 is shown as including switching elements 33 that can be operated to enable or completely disable the output provided from the battery cells 24 to the battery output 34 of the battery pack 20.

The marine battery pack 20 further includes a battery control processor 36 that is able to communicate with the internal BMS to control and dictate the operation of the internal BMS 32. The battery control processor 36 is connected to the internal BMS 32 by a controller area network (CAN) and is able to communicate externally from the battery pack 20 utilizing a controller area network (CAN) transceiver 38. The CAN transceiver 38 provides the required communication channels such that the battery control processor 36 can communicate externally from the marine battery pack 20 to other external devices, such as an engine control module (ECM) or a propulsion control module (PCM), which are schematically shown in FIG. 4 by reference numeral 40. As illustrated in FIG. 4, the engine PCM 40 includes a similar CAN transceiver 42 along with a control processor 44. In the embodiment illustrated in FIG. 4, the engine PCM 40 functions as a first type of authentication device 50 that performs the authentication function for the battery pack 20 in accordance with the present disclosure.

Figure 5:
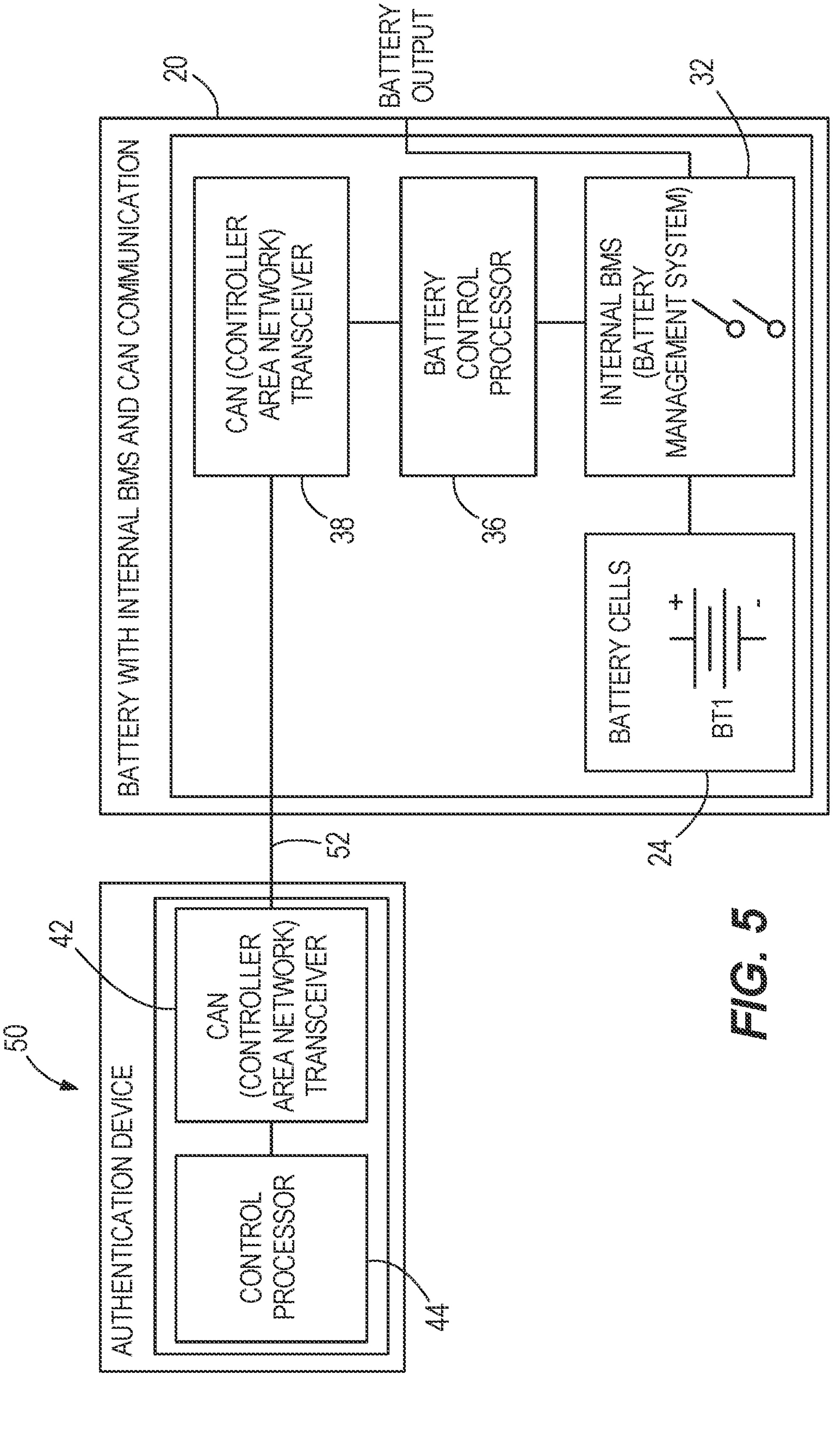
FIG. 5 is a schematic view of the theft deterrent system in accordance with another exemplary embodiment of the present disclosure.

Referring now to FIG. 5, a second exemplary embodiment of the present disclosure is illustrated. In the second exemplary embodiment shown in FIG. 5, the authentication device 50 is shown generally. The authentication device 50 that can communicate to the marine battery pack 20 through the communication line 52. The authentication device 50 shown in FIG. 5 could be any type of device that is able to communicate with the battery control processor 36. In the embodiment shown in FIG. 5, the authentication device includes the control processor 44 along with the CAN transceiver 42.

Figure 6:
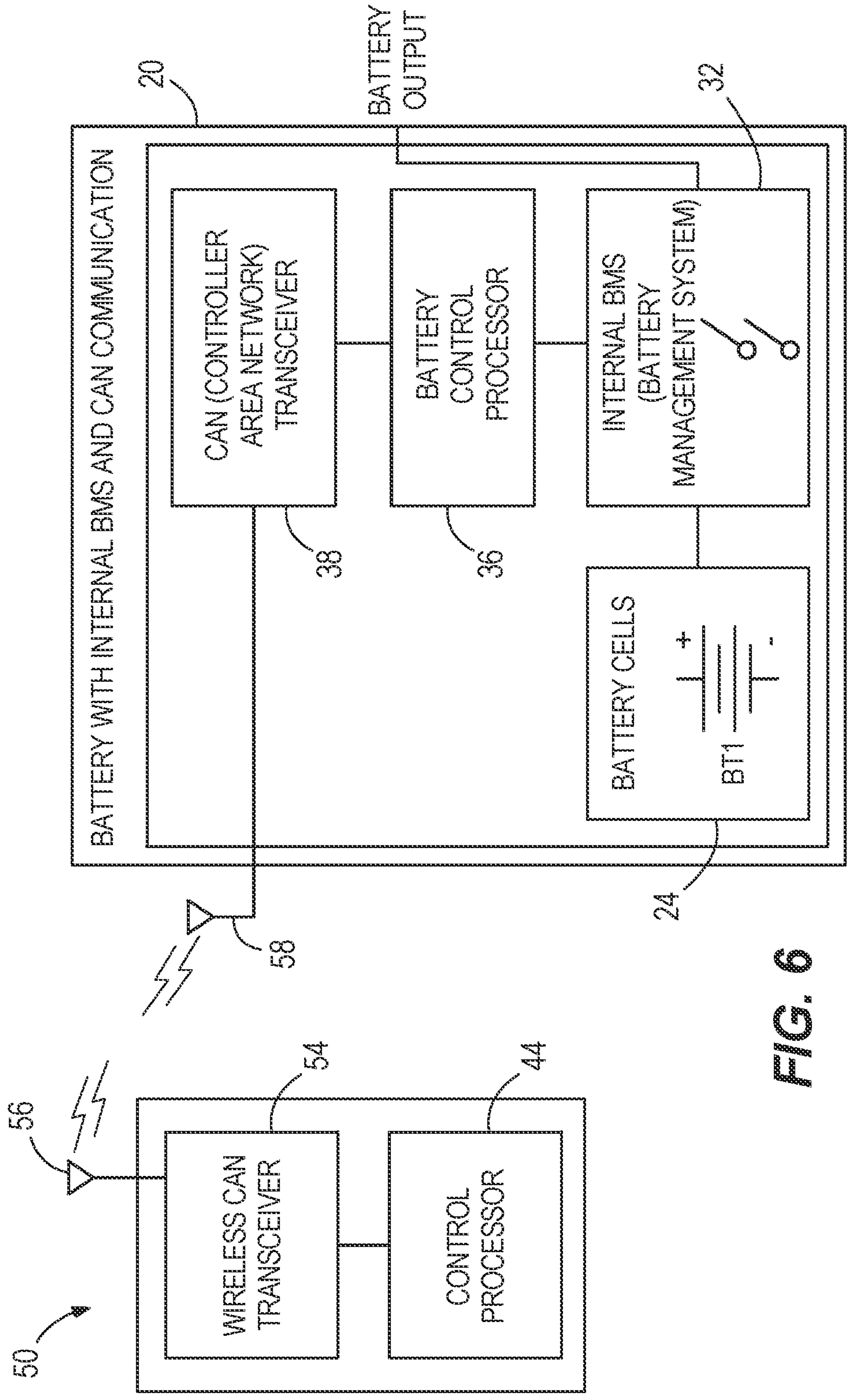
FIG. 6 is a schematic view of the theft deterrent system in accordance with another exemplary embodiment of the present disclosure.

Although the communication line 52 is shown in FIG. 5 as being a hard-wired connection, it should be understood that the communication between the marine battery pack 20 and the authentication device 50 could be through either wired (FIGS. 4 and 5) or wireless communication, which is schematically illustrated in FIG. 6.

In FIG. 6, the CAN transceiver 42 shown in FIGS. 4 and 5 is replaced by a wireless CAN transceiver 54. The wireless CAN transceiver 54 is connected to an antenna 56 such that information and commands can be transmitted and received wirelessly from the authentication device 50. A corresponding antenna 58 is included in the battery pack 20 and is connected to the CAN transceiver 38. In the embodiment shown in FIG. 6, the CAN transceiver 38 contained within the marine battery pack 20 would be a wireless transceiver that would allow for wireless communication between the marine battery pack 20 and the authentication device 50. It is contemplated in other embodiments, the authentication device 50 could communicate using other communication components that would eliminate the need for the wireless CAN transceiver. For example, the wireless authentication device 50 could be a remote control for the marine propulsion device and would communicate with the battery pack 20 using wireless communications techniques such as but not limited to RFID, Bluetooth, Zigbee or any other wireless techniques or protocol.

In a contemplated embodiment the wireless authentication device 50 could be a remote controller that is used to operate the marine propulsion device and acts as a security device for the marine propulsion device. Such a system could be a digital security device such as the 1$^{st}$ Mate system available from Mercury Marine. The 1$^{st}$ Mate system provides digital security for the operation of a marine engine and includes an engine-integrated intelligent hub that connects a set of wearable fobs with a mobile-device app to deliver alerts and provides theft-deterrent functionality for the marine propulsion device, the boat and the operator. In such an application, the battery pack 20 could communicate with a mobile phone, fob or remote, which would then communicate with the engine-integrated intelligent hub. The communication would thus be from the battery pack 20 to the intelligent hub for authentication as will be described.

Figure 7:
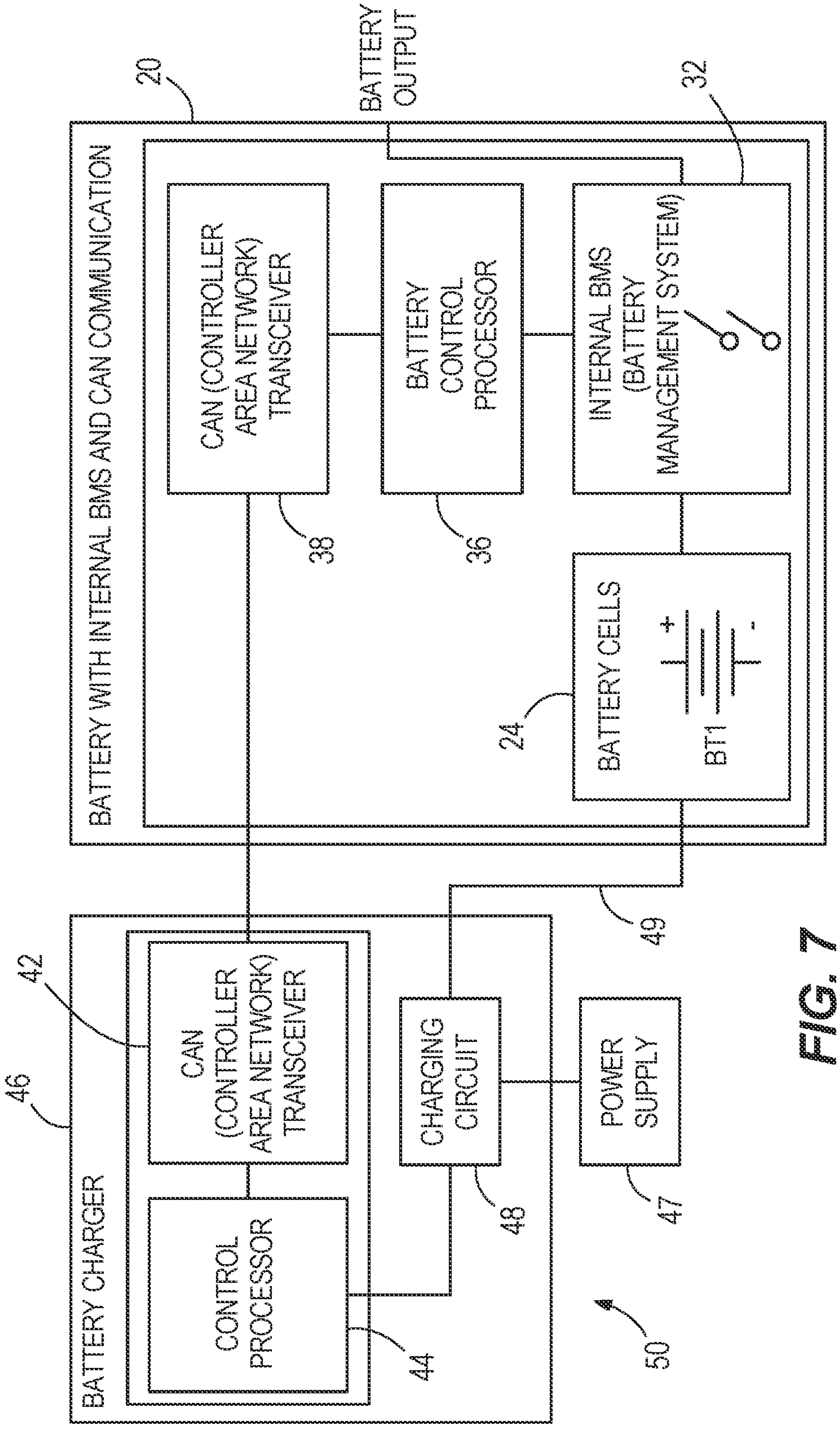
FIG. 7 is a schematic view of the theft deterrent system including a battery charger in accordance with another exemplary embodiment of the present disclosure.

FIG. 7 illustrates yet another contemplated embodiment for the authentication device 50. In the embodiment illustrated, the authentication device 50 is a battery charger 46 that is operable to recharge the battery pack 20 after the battery pack 20 has been discharged following use. The battery charger 46 includes a similar control processor 44 along with the CAN transceiver 42 as in the previous embodiments. The battery charger 46 is connected to a utility power supply 47 and includes an internal charging circuit 48 that supplies regulated power to the battery pack 20 through a charging line 49. When the battery pack 20 is connected to or coupled to the battery charger 46, power can be supplied to recharge the battery cells 24 as dictated and controlled by the BMS 32. As an illustrative example, the BMS 32 can control a ground connection for the battery cells 24 that will allow a charging current to flow into the battery cells 24 from the battery charger 46. In this way, the BMS 32 can control whether current will flow from the battery charger 46 to charge the battery cells 24.

Figure 8:
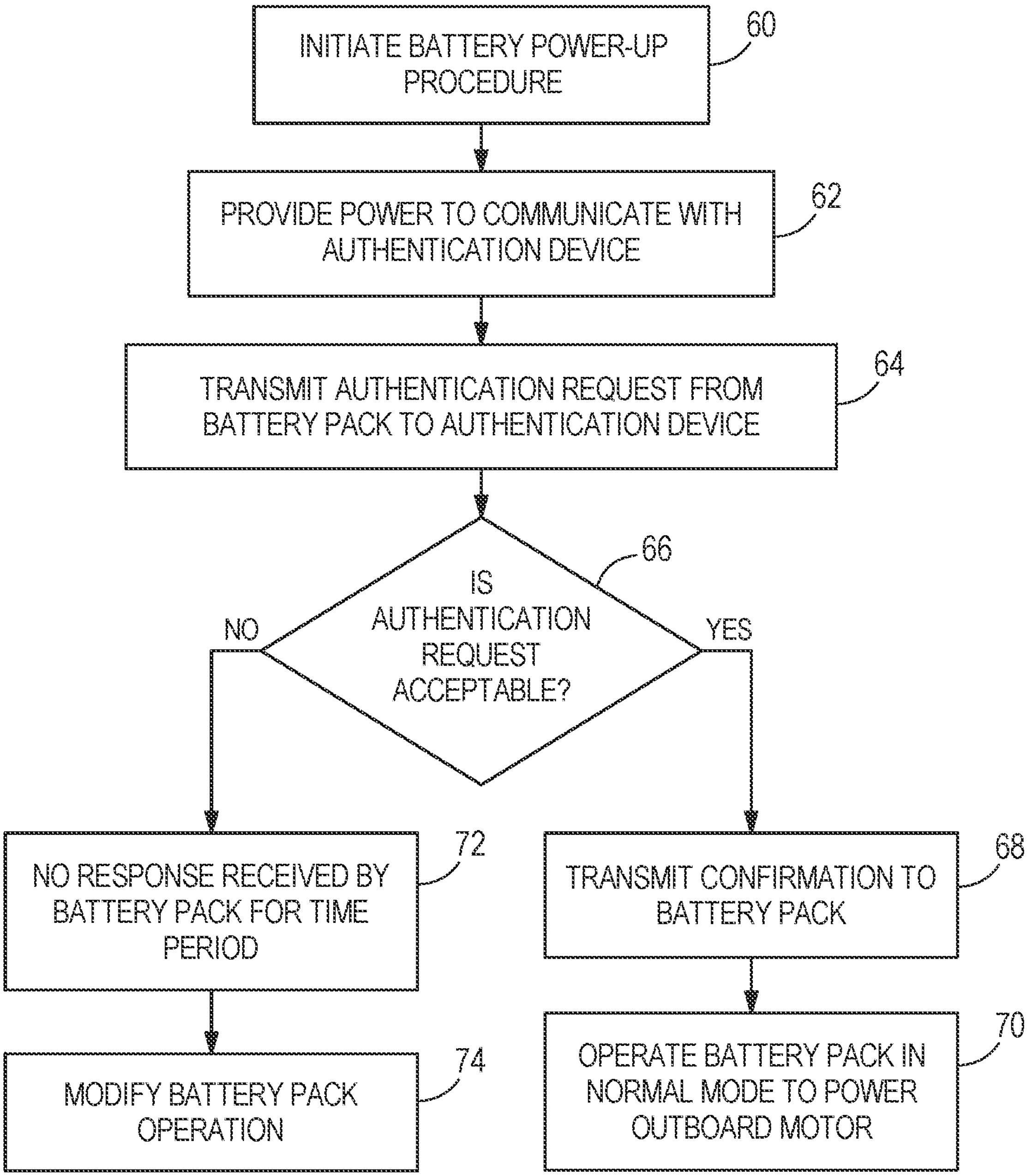
FIG. 8 is a flow chart depicting a method for deterring theft of a marine battery pack by modifying the operation of the marine battery pack.

FIG. 8 provides a flowchart for one exemplary method of deterring the theft of the marine battery pack 20 that is configured to power the marine propulsion device 10. Although an exemplary method of operation is shown in the flowchart of FIG. 8, it should be understood that various other methods of operation are contemplated as being within the scope of the present disclosure and some of which will be described in greater detail below.

Referring now to FIGS. 4 and 8, the initial step in the method of the present disclosure includes initiating a battery power-up procedure 60. The initial battery power-up procedure 60 can be initiated when the battery pack 20 is installed within the outboard motor or upon activation of a start button or any other similar device that is meant to initiate operation of the marine propulsion device. When the power-up procedure begins in step 60, the battery control processor 36 communicates with the internal BMS 32 to provide an initial supply of power to begin a communication session with an authentication device 50. In the embodiment shown in FIG. 4, the BMS 32 provides power at the battery outlet 34. In the embodiment where the authentication device 50 is connected by a wire to the battery pack 20, when power is supplied to the battery outlet output 34, the authentication device 50 is also provided power, as shown in step 62. In an embodiment such as shown in FIG. 6, power is supplied to the wireless CAN transceiver 38 to allow the transceiver 38 to operate.

In the embodiment shown in FIG. 4, when both the authentication device 50 and the marine battery pack 20 are provided with power from the battery cells 20, the battery control processor 36 transmits an authentication request from the battery pack 20 to the authentication device 50 across the communication line 52. Such action is shown by step 64 in FIG. 8. In the embodiment shown in FIG. 6, the authentication request is a wireless message transmitted by the antenna 58 and received by the antenna 56 of the wireless authentication device 50.

It is contemplated that the authentication request can be in the form of an authentication code or message that is associated with the battery pack 20. As a contemplated example, the authentication code/message can be a unique code/message that is assigned only to the specific, individual battery pack 20. The unique identification code/message could be a series of letters and numbers, or any other type of code/message, that uniquely identifies the marine battery pack 20. In one alternate embodiment, it is contemplated that every marine battery pack 20 from a specific manufacturer could have the same authentication code that identifies the marine battery pack as originating from a the specific manufacturer, such as a battery pack sold by Mercury Marine®. Although such embodiment is possible, it is contemplated that in order to eliminate possible tampering or hacking, each individual marine battery pack 20 will have its own unique authentication code/message stored within the battery control processor 36. The unique code/message can be assigned either at the time of manufacture or by using a password-protected secure communication link that assigns the authentication code/message to the marine battery pack 20 after manufacture.

It is contemplated that the authentication code/message that is assigned to the marine battery pack 20 can be associated with either one or multiple authentication devices 50. The authentication code/message for one or more marine battery packs 20 can be stored within memory of the control processor 44 of the authentication device 50. As an example, the engine PCM 40 associated with a marine propulsion device can be configured to allow pairing and authentication with more than one marine battery pack 20 by storing the authentication codes/messages of the more than one marine battery packs 20 within the memory of the control processor 44. In this manner, battery packs can be swapped out when they become discharged and multiple battery packs 20 can be authenticated by the engine PCM 40. In another contemplated embodiment, marine propulsion devices from a manufacturer will include a listing of the authentication codes/messages for marine battery packs 20 manufactured by the same manufacturer. Thus, the marine propulsion device including the engine PCM 40 would be able to pair and mate with every marine battery pack 20 from the same manufacturer. In other embodiments in which a single marine propulsion device 10 is used as part of a fleet that includes a number of battery packs 20 that can be swapped between all of the members of the fleet, each of the battery packs 20 will associated with each member of the fleet. In this embodiment, the control processor 44 of each authentication device 50 of the fleet would store the authentication codes/messages from all of the marine battery packs 20 that are also part of the fleet. Thus, each battery pack 20 can be associated with a plurality of authentication devices and can be used with those devices but not other non-associated authentication devices.

Referring back to FIG. 8, the control processor 44 of the authentication device determines in step 66 whether the authentication request received from the marine battery pack 20 is acceptable. Typically, this would be carried out by comparing the received authentication request with authentication codes/messages stored in memory of the control processor. If the control processor 44 determines that the authentication request is acceptable, the control processor will communicate a confirmation message back to the battery control processor 36 that the authentication request was accepted, such as shown in step 68. Upon receiving the confirmation message or reply, the battery control processor 36 will communicate to the BMS 32 of the marine battery pack 20 that the BMS 32 can allow for normal operation of the marine battery pack 20, as illustrated in step 70. As can be understood, the communication of the authentication request to the authentication device 50 and the return of a confirmation that the authentication request was accepted will allow the marine battery pack 20 to operate in a normal manner to provide power to the marine propulsion device 10 in the known and anticipated manner.

In step 66, if the authentication device 50 does not find the authentication request to be acceptable, the authentication device will not return a confirming message or response back to the battery pack. The authentication device 50 could either return no response or could return a "denied" message or code that would be received by the battery pack. If the power up procedure is initiated for the battery pack 20 and the battery pack 20 is not connected or in communication range of an authentication device, but instead is connected to some other electrical device that requires battery power to operate, the unauthorized device will not be able to return a proper confirmation of receipt and authentication of the authentication request. Thus, in step 66, if the marine battery pack 20 is connected to an unauthorized device or is not in communication range with the proper authentication device, there will be no ability for the unauthorized device to return an indication of an acceptable request being received. In such situation, the battery pack 20 will be rendered unusable. Rendering the battery pack 20 unusable can be carried out in many different ways, as will be discussed below.

In the embodiment of FIG. 4, it is contemplated that the battery control processor 36 will send out the authentication request across the communication line 52 and will wait for confirmation from an authentication device 50. If no confirmation is received within a pre-defined waiting period, the battery control processor 36 will proceed to step 72 and determine that the marine battery pack 20 is either not being used with an authentic device or with is being used with an authentication device that is an authorized authentication device for the battery pack 20. In either case, upon making this determination after the expiration of the waiting period, the battery control processor 36 proceeds to step 74 in which the battery control processor 36 communicates with the internal BMS 32 such that the internal BMS 32 modifies the normal operation of the battery pack. The waiting time period can be selected as a time period longer than the typical amount of time that it would take for the authentication of the authentication request and the return of a confirmation from the authentication device. Although the flowchart of FIG. 8 proceeds directly to the modification of the battery pack operation in step 74, the system and method disclosed could return to step 62 and resend the authentication request and then wait for the response. This process could repeat a number of times before the method moves to step 74. It should be understood that the system and method will move to step 74 if the authentication request is not confirmed by the authentication device after some period of time or number of communication attempts.

It is contemplated that the battery management system (BMS) 32 could modify the operation of the battery pack 20 in a number of different ways, some of which will be described in detail below. In each modified operation, the battery pack 20 will not operate in a normal manner and will be generally rendered ineffective. Thus, in accordance with the present disclosure, if the battery pack 20 is not properly authenticated by the authentication device 50, the battery pack 20 will either cease to operate or will operate in a highly modified fashion that will generally render the battery pack 20 unusable. It is contemplated that by rendering the battery pack 20 unusable without proper authentication, such modification in the operation of the battery pack will render the battery pack undesirable for theft.

In a first exemplary embodiment, the operation of the marine battery pack 20 can be modified by initially allowing the BMS 32 to output 100 percent of the power from the battery cells 24 for only a short duration of time to allow the authentication device 50 to power up and communicate with the marine battery pack 20. If the confirmation of the authentication request is not received, the BMS 32 will completely shut down the power at the battery output 34 and a timer will be started. At the expiration of the internal timer, the battery control processor will again send the authentication request and await for confirmation. If no confirmation is received, power will then be interrupted and this process will continue until either confirmation of the authentication code is received or an activation timer expires and the battery pack again goes into a sleep mode. In accordance with this first exemplary embodiment, the battery control processor 36 attempts to communicate to the authentication device 50 by providing power at the battery output 34 for only the amount of time necessary for the authentication device to power up and confirm the authentication code. If no confirmation is received from the authentication device 50, the battery control processor 36 will ultimately prevent operation of the marine battery pack 20.

In another contemplated exemplary embodiment, the battery control processor 36 will modify the battery pack operation by limiting the amount of current that can be drawn from the battery pack 20 at the battery output 34. As indicated previously, if confirmation of the authentication request is not received, the battery control processor 36 will modify the battery pack operation to prevent the battery pack from operating in a normal manner. In this contemplated, exemplary embodiment, the BMS 32 will begin to monitor the amount of current drawn from the battery pack 20. If the amount of current draw exceeds a nominal amount, such as ten percent of the maximum current draw, the BMS 32 will determine whether the amount of current draw is in the range that indicates the battery pack 20 is operable to power equipment. If the current draw is above this value, the BMS 32 is signaled to prevent any additional current discharge, which renders the marine battery pack 20 unusable.

In another contemplated embodiment, the battery control processor 36 can modify the operation of the BMS 32 to allow only the minimum required amount of current and voltage that is sufficient to operate the marine propulsion device at a very low speed and only enough sufficient to power the gauges within the marine propulsion device. Such low current supply from the battery pack 20 to the marine propulsion device would allow the marine vessel to "limp"

home. Such embodiment would insure that if an error were to occur in the authentication process, the marine battery pack 20 would still be allowed to provide a small amount of current output that would allow the marine propulsion device 10 to be operated at a very low speed sufficient to return an operator to a safe location. Such contemplated embodiment would be useful when some type of error occurs in the authentication process and the boat operator is on the water and needs to return to a safe dock or port. Such modification in the operation of the battery pack would be an inconvenience to the user and would be enough of an inconvenience to deter possible battery theft and use of the battery pack in other applications.

In yet another contemplated exemplary embodiment, if the battery pack is not properly authenticated, the battery control processor 36 and BMS 32 can modify the battery pack operation by allowing the battery pack 20 to operate in a normal manner until the battery pack 20 is completely discharged. Once the battery pack 20 has been completely discharged, the battery pack 20 would be locked-out until the battery pack 20 is mated with a battery charger that can properly authenticate the authentication code, such as shown in FIG. 7. In such an embodiment, the authentication device 50 would be a battery charger 46 that is able to receive the authentication request from the battery pack 20 through the communication line 52. The battery charger 46 would then properly authenticate the authentication request and return a confirmation to the battery processor 36. Once a confirmation is returned from the battery charger 46, the battery control processor 36 will provide an indication to the internal BMS 32 that will allow the battery pack 20 to be recharged.

If no authentication confirmation is received, the internal BMS 32 will create an open circuit such that the battery cells 24 cannot be charged, even though connected to the charging circuit 48. Such modification to the use and operation of the marine battery pack 20 has the advantages that a boat operator can return to port after some type of failure in the authentication process, especially when the battery pack is authorized and is being used with an authorized propulsion device. After the complete discharge, the battery pack 20 would then need to be authenticated before the battery pack can be recharged by the battery charger 46. Another advantage of such modification to the operation of the battery pack 20 would be that the authentication device 50 can be located in a secure location such that the authentication of the battery pack 20 would take place only in the secure location, which would again be a deterrent to theft.

In an embodiment in which the authentication device 50 is part of a battery charger 46, the battery control processor 36 would need to receive confirmation of an authentication request before the battery control processor 36 would allow the BMS 32 to fully charge the battery pack. If the battery pack 20 was not authenticated by the authentication device 50, the BMS 32 may allow only a small percentage of charge for the battery pack 20, which would generally render the battery ineffective for use by others while still providing some charge to the battery pack 20 to prevent damage such as going to deep in the depth of discharge. Since the battery pack 20 would not be fully charged unless the battery pack is authenticated by the battery charger 46, the battery pack 20 would be ineffective and thus further deter theft.

Referring now to FIG. 6, in the embodiment illustrated, the authentication device 50 includes a wireless CAN transceiver 54. Since the authentication device 50 is able to communicate with the battery pack 20 over a wireless communication network, the authentication device could be one of a variety of different devices. As an example, the authentication device 50 could be a smartphone, an engine ECU located remotely from the battery pack 20, a theft deterrent module associate with the boat including the marine propulsion device, or any other type of remote system that is able to communicate with the marine battery pack 20 and authenticate the authentication requests received from the battery pack 20. Once the authentication device 50 authenticates the authentication code, the authentication device 50 sends confirmation back to the marine battery pack 20 in the same manner as described with the wired connections of the previous figures.

It is contemplated that a single marine propulsion device may be part of a fleet in which the fleet includes multiple marine battery packs 20 that can be swapped between the series of marine propulsion devices. In accordance with the present disclosure, each of the marine propulsion devices would include some type of authentication device that is able to authenticate a plurality of different marine battery packs. In this manner, one authentication device can be paired with multiple battery packs. In addition, each individual battery pack 20 can be paired with multiple authentication devices, which would thus allow swapping of authorized batteries between authorized marine propulsion devices. Such embodiment would prevent the theft of the marine battery pack since the marine battery pack would be usable only with authentication devices that recognize the authentication code from the marine battery pack.

As can be understood in FIGS. 4-5, the battery control processor 36 and the control processor within the authentication device each include some type of CAN transceiver. The CAN transceiver thus allows communication to both the marine battery pack 20 and the authentication device. Such communication allows an authorized dealer or representative of the marine battery packs to reset and reprogram both the authentication code associated with the marine battery pack and the authentication codes that can be received and accepted by the authentication device 50. Thus, the authentication codes can be reset and the number of authentication codes accepted by the authentication device 50 can be modified after manufacture and in the field.

Referring back to FIG. 6, in an embodiment in which the authentication device 50 is a smartphone, the smartphone can include password-protected application software on the smartphone to allow the user to control different functions of the marine battery pack 20. As an example, the user can quickly turn on and off the ability of the battery pack to provide power, which would generally replicate a digital on/off switch on the battery pack. In another embodiment, the user can choose to turn off the battery pack after use to insure that the battery pack 20 would be usable only when turned back on by the password protected application software on the smartphone. In another contemplated embodiment, the user could allow temporary use of the battery pack which would allow another person to operate marine propulsion device until the battery pack had been completely discharged. It is contemplated that upon complete discharge, the battery pack would again need to authenticate itself with an authorization device before the battery pack could again be charged and reused. Such functionality would generally emulate a valet key in which the battery pack would be usable only to a certain point and then not be usable after complete discharge. Such operation would again aid in deterring theft of the battery pack.

This written description uses examples to disclose the invention, including the best mode, and also to enable any person skilled in the art to make and use the invention.

Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art in view of the present disclosure. Such other examples are intended to be within the scope of the claims if they have features or structural elements that do not differ from the literal language of the claims, or if they include equivalent features or structural elements with insubstantial differences from the literal languages of the claims.

We claim:

1. A system for deterring theft of a removable component of a marine propulsion device including an electric motor, the system comprising:

a marine battery pack operable to provide power to the electric motor to drive the electric motor, the marine battery pack including one or more battery cells contained in an outer housing, an internal communication system contained within the outer housing, and an internal battery management system contained within the outer housing of the marine battery pack;

an authentication device located within the marine propulsion device, wherein the authentication device is in communication with the internal communication system of the marine battery pack when the marine battery pack is received in and connected to the marine propulsion device, wherein the internal battery management system of the marine battery pack communicates with the authentication device to authenticate the marine battery pack when the marine battery pack is received in and connected to the marine propulsion device, wherein the operation of the marine battery pack is modified by the internal battery management system to restrict an output of the one or more battery cells upon a failure to authenticate the marine battery pack.

2. The system of claim 1 wherein the operation of the marine battery pack is modified by the internal battery management system by limiting the rate of current discharge such that the marine propulsion device operates at less than full speed.

3. The system of claim 1 wherein the operation of the marine battery pack is modified by the internal battery management system by limiting the duration of power output to less than a duration of a full discharge of the marine battery pack.

4. The system of claim 1 further comprising a remote authentication device located within a battery charger and operation of the marine battery pack is modified by the internal battery management system to prevent the battery charger from recharging the marine battery pack without authentication from the remote authentication device.

5. The system of claim 1 wherein the operation of the marine battery pack is modified by the internal battery management system by preventing the discharge of current from the marine battery pack.

6. The system of claim 1 wherein the authentication device is capable of authenticating more than one marine battery pack.

7. A removable marine battery pack for use in providing power to drive an electric motor of a marine propulsion device, comprising:

an outer housing one or more battery cells contained in the outer housing;

an internal communication system contained within the outer housing and operable to communicate an authentication request and receive a confirmation in response to the authentication request from an authentication device located within the marine propulsion device when the removable marine battery pack is received in the marine propulsion device, wherein the authentication device communicates with the internal communication system of the marine battery pack when the marine battery pack is received in and connected to the marine propulsion device; and an internal battery management system contained within the outer housing, wherein the internal battery management system modifies the operation of the marine battery pack to restrict an output of the one or more battery cells upon a failure to receive the confirmation from the authentication device of the marine propulsion device.

8. The marine battery pack of claim 7 wherein the operation of the marine battery pack is modified by the internal battery management system by limiting the rate of current discharge such that the marine propulsion device operates at less than full speed.

9. The marine battery pack of claim 7 wherein the operation of the marine battery pack is modified by the internal battery management system by limiting the duration of power output from the marine battery pack to less than a full discharge duration of the marine battery pack.

10. The marine battery pack of claim 7 further comprising a remote authentication device located within a battery charger and the internal battery management system modifies operation of the marine battery pack to prevent recharging of the marine battery pack without authentication from the remote authentication device.

11. The marine battery pack of claim 7 wherein the operation of the marine battery pack is modified by the internal battery management system by preventing the discharge of current from the marine battery pack.

12. The marine battery pack of claim 7 wherein the internal communication system is capable of being authenticated by a plurality of different authentication devices.

13. A method of deterring theft of a removable marine battery pack having an outer housing containing one or more battery cells, the marine battery pack being configured to provide power to drive an electric motor of a marine propulsion device, comprising:

providing an internal communication system within the outer housing of the marine battery pack;

communicating an authentication request from internal communication system of the marine battery pack;

receiving the authentication request at an authentication device located within the marine propulsion device when the marine battery pack is received in and connected to the marine propulsion device;

transmitting a confirmation from the authentication device of the marine propulsion device to the marine battery pack upon authentication of the authentication request received from the marine battery pack;

providing an internal battery management system within the outer housing of the marine battery pack;

utilizing the internal battery management system to allow for normal operation of the marine battery pack to provide power to the electric motor to drive the electric motor upon receipt of the confirmation;

utilizing the internal battery management system to modify the operation of the marine battery pack and restrict an output of the one or more battery cells upon failure to receive the confirmation from the authentication device.

14. The method of claim 13 wherein the operation of the marine battery pack is modified by the internal battery management system by limiting the rate of current discharge such that the marine propulsion device operates at less than full speed.

15. The method of claim 13 wherein the operation of the marine battery pack is modified by the internal battery management system by limiting the duration of power output from the marine battery pack to less than a full discharge duration of the marine battery pack.

16. The method of claim 13 further comprising a remote authentication system located within a battery charger and operation of the marine battery pack is modified by the internal battery management system to prevent recharging of the marine battery pack without authentication from the remote authentication device.

17. The method of claim 13 wherein the operation of the marine battery pack is modified by the internal battery management system by preventing the discharge of current from the marine battery pack.

* * * * *